(Model.)
A. HAMM.
CLAW BAR.
No. 282,722. Patented Aug. 7, 1883.
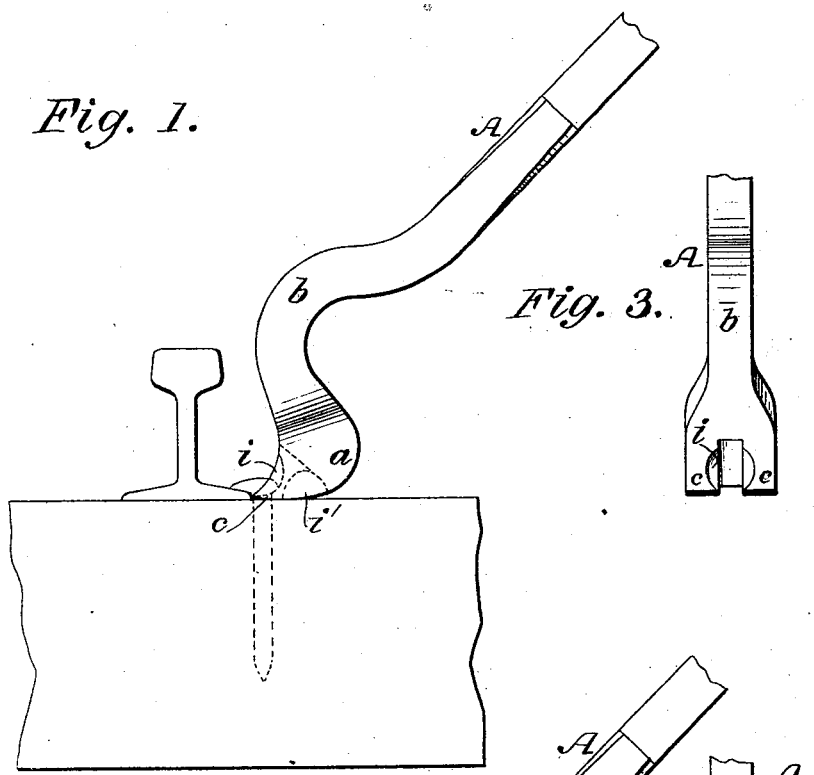
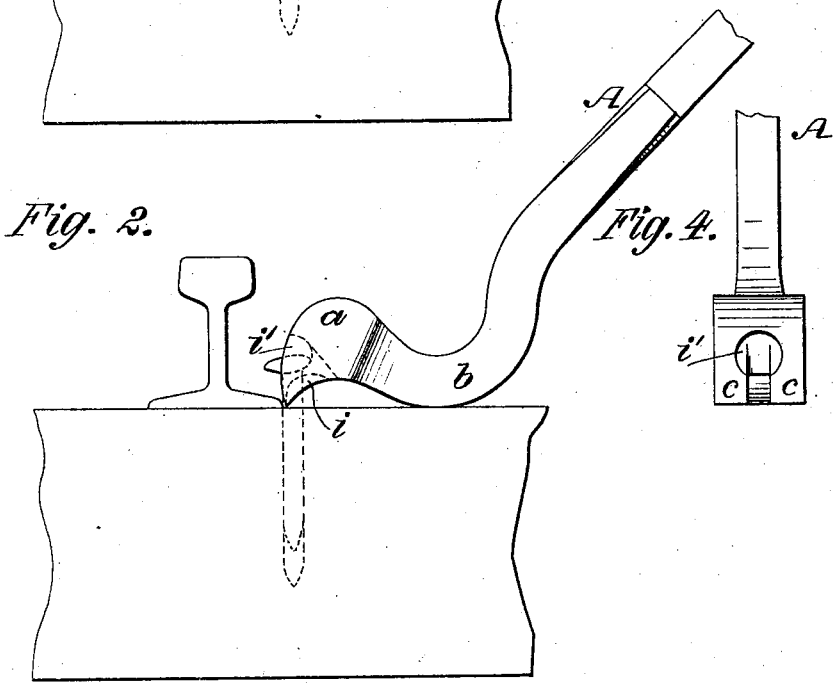
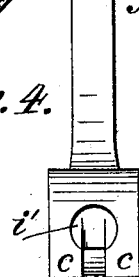
WITNESSES:
INVENTOR:
A. Hamm
BY Munn & Co
ATTORNEYS.

United States Patent Office.

ARON HAMM, OF SAYRE, PENNSYLVANIA, ASSIGNOR OF ONE-THIRD TO JAMES N. WEAVER, OF SAME PLACE.

CLAW-BAR.

SPECIFICATION forming part of Letters Patent No. 282,722, dated August 7, 1883.

Application filed May 17, 1883. (Model.)

*To all whom it may concern:*

Be it known that I, ARON HAMM, of Sayre, in the county of Bradford and State of Pennsylvania, have invented a new and Improved Claw-Bar, of which the following is a full, clear, and exact description.

My invention relates to claw-bars used for drawing nails and spikes, and is more especially intended for use on railroads for drawing spikes from the ties in re-laying or repairing the road; and the invention consists in bending the bar and recessing it at the claw end in such a manner that it is adapted for entirely withdrawing the spike from the timber without the use of "bate," and without bending the spike.

Reference is to be had to the accompanying drawings, forming a part of this specification, in which similar letters of reference indicate corresponding parts in all the figures.

Figure 1 is a side elevation of my new and improved claw-bar, showing the manner of using the bar for starting the spike. Fig. 2 is a similar view, showing the claw-bar reversed and applied to the started spike for withdrawing it entirely from the timber. Fig. 3 is a front elevation of the claw end of the bar held in the position shown in Fig. 1, and Fig. 4 is an elevation of the claw end with the bar held in the position shown in Fig. 2.

The claw-bar A is formed with the short fulcrum, $a$, and the long fulcrum, $b$, and is adapted for starting the spike with the short fulcrum where great power is required, and also for withdrawing the spike entirely with the long fulcrum without bating up the tool, as must be done with the old form of claw-bar.

The claw end of the bar is slotted in the ordinary manner to form the claws $c\ c$ for engaging with the head of the nail or spike to be drawn, and by preference has the recesses $i\ i'$ formed in it upon opposite sides at the terminus of the slot to form seats for the head of the nail or spike, thus fitting the bar to be used in the position shown in Fig. 1 for starting the spike, and to be reversed and used in the position shown in Fig. 2 for entirely removing the spike from the timber.

The advantage of this form of claw-bar is that by it spikes or nails may be entirely withdrawn from the timber without the labor, trouble, and loss of time incident to bating the tool, and that the spikes or nails may be withdrawn without bending, so that they may be used again.

Having thus described my invention, I claim as new and desire to secure by Letters Patent—

The claw-bar A, formed with the short fulcrum, $a$, long fulcrum, $b$, claws $c\ c$, and recesses $i\ i'$ on opposite sides of the claw, adapting the bar to be reversed, substantially as and for the purposes set forth.

ARON HAMM.

Witnesses:
J. N. WEAVER,
C. A. BLOOD.